United States Patent
Blum et al.

[15] 3,680,197
[45] Aug. 1, 1972

[54] DIFFUSION BONDING METHOD

[72] Inventors: Bernard Saul Blum, Longmeadow, Mass.; Marvin Lee Kohn, Southfield, Mich.

[73] Assignee: United Aircraft Corporation, East Hartford, Conn.

[22] Filed: Nov. 5, 1969

[21] Appl. No.: 874,162

[52] U.S. Cl. ...................29/487, 29/497, 29/498
[51] Int. Cl. ...................................B23k 31/02
[58] Field of Search.................29/487, 497, 498

[56] References Cited

UNITED STATES PATENTS

| | | | |
|---|---|---|---|
| 2,834,102 | 5/1958 | Pflumm et al. | 29/497 |
| 2,961,762 | 11/1960 | Clark et al. | 29/498 X |
| 3,025,592 | 3/1962 | Fischer et al. | 29/498 X |
| 3,145,466 | 8/1964 | Feduska | 29/498 X |
| 3,435,182 | 3/1969 | Rietsch | 29/487 X |
| 3,470,037 | 9/1969 | Suzuki | 29/498 X |
| 3,486,219 | 12/1969 | Davies et al. | 29/487 X |

*Primary Examiner*—John F. Campbell
*Assistant Examiner*—Ronald J. Shore
*Attorney*—Richard N. James

[57] ABSTRACT

A diffusion bonding method for the alloys exhibiting a defined recrystallization temperature, or eutectoid or peritectoid behavior as part of their phase equilibrium characteristics, which involves repetitively cycling the alloy to be joined between a temperature slightly above and below the recrystallization temperature, or allotropic transformation temperature, and controlling the rate of new grain nucleation and growth across the joint interface.

3 Claims, 1 Drawing Figure

HEATING-COOLING CYCLE
COLD CATHODE HEAT SOURCE

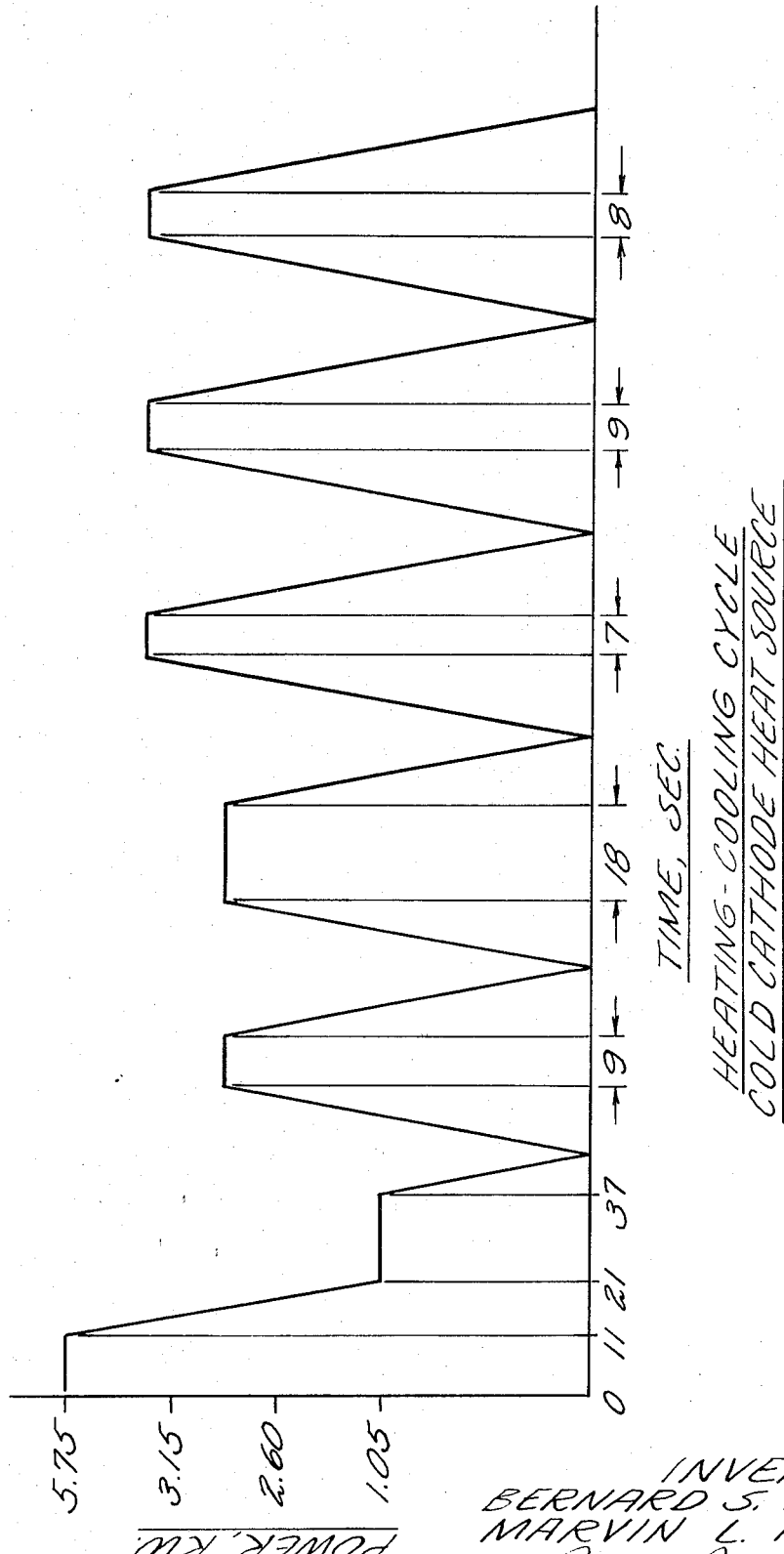

DIFFUSION BONDING METHOD

BACKGROUND OF THE INVENTION

The present invention relates in general to the art of diffusion bonding and, more particularly, to methods for diffusion bonding those alloys characterized by a well-defined recrystallization or allotropic transformation temperature.

The processes typically referred to a diffusion bonding actually involve the growth of new grains across the joint interface and, thus, do not actually require diffusion per se but rather involve recrystallization of the metal. When properly conducted, the process results in the removal of all evidence of the prior interface and, metallurgically, no substantial heterogeneity exists at the joint as is the case with other joining methods.

In the usual procedure, the desired bond is effected through the use of heat and high pressure at the joint for extended periods of time. This results in the formation of the joint without fusion of the metals and eliminates the formation of the coarse grains produced in processes where cooling from a melt is involved. A major drawback to the diffusion bonding processes, however, is the lengthy time element during which the parts must be held together at high temperatures and pressures. Furthermore, and depending to some extent upon the geometry of the parts involved, the usual processes often result in the generation of considerable distortion of the parts, particularly at the interface, as a result of the pressures involved.

SUMMARY OF THE INVENTION

The present invention provides a method for improving the rate of bonding and minimizing the extent of the distortion involved in diffusion bonding those alloys which display a well-defined recrystallization or allotropic transformation temperature. It involves a rapid, repetitive heating and cooling cycle between temperatures slightly above and below the alloy recrystallization temperature or allotropic transformation temperature of the alloy or alloys while the parts to be joined are held in intimate contact at the interface, and a high rate of recrystallization and generation of new grain nuclei while controlling grain growth at the interface.

BRIEF DESCRIPTION OF THE DRAWING

The drawing is a graphical illustration of the cyclic heating phase of the present invention.

DESCRIPTION OF THE PREFERRED EMBODIMENTS

The improvements of the present process are primarily directed toward those alloys exhibiting either a well-defined allotropic transformation or recrystallization temperature. Iron, manganese, titanium and uranium are allotropic and, in general, provide compositions having different allotropes. Thus, in the typical iron-base alloy the low temperature alpha phase is body-centered cubic and the high temperature gamma phase is face-centered cubic, and heating the alloy through the temperature range crossing the transus between the alpha and gamma phases causes transformation of the mixture of alpha iron plus carbide to gamma iron. Numerous other alloy systems, including beryllium-copper, copper-tin, etc., provide eutectoid or peritectoid transformations. For the purpose of this invention in the alloys displaying multi-allotrope characteristics, when this mechanism is employed in the bonding operation, the transformation between allotropes must be a readily achieved phenomenon.

Many complex alloys, including a number of the nickel-base superalloys exhibit a well-defined recrystallization temperature. The recrystallization temperature of an alloy of given composition may vary somewhat depending upon its fabrication history, particularly the amount of cold work performed therein. The working of the metal results in stored free energy in the bulk metal which energy is part of the driving force for recrystallization. As recrystallization takes place, there is a decrease in stored free energy providing a metallurgical condition more stable than the as-worked condition.

Because of the relationship of recrystallization temperature to prior metal history, the assignment of a particular temperature to a particular alloy is subject to some variation. This is well recognized by those in the art. In general, however, and as a good first approximation for an alloy of unknown history, the ratio of absolute recrystallization temperature (°K) to the alloy melting point (°K) is taken at about 0.4.

Typical recrystallization temperatures for a number of metals and alloys as commonly processed are set forth in Table I.

It is desirable that the microstructure at the joint after diffusion bonding be characterized by the presence of fine rather than coarse grains. It is known that the ultimate grain size of an alloy is normally a function of temperature, time at temperature and the degree of cold working, and that the final grain size at the interface is affected by the high temperature grain size. In general, grain size is proportional to time and temperature and inversely proportional to cold work, although it should be noted that in the present process cold work is not required.

The rate at which a satisfactory diffusion bond is achieved is dependent upon the rate of recrystallization or phase transformation of the alloy during the bonding sequence. At the same time, the conditions imposed upon the system must be such as to provide the optimum metallurgical structure during and after bonding such that the optimum physical properties are attained. In particular, as previously mentioned, a fine grain microstructure without the necessity for cold work is desirable.

The present process improves the rate of diffusion bonding while at the same time promoting the favorable conditions for a resultant fine grain microstructure. This is accomplished by appropriate control of the processing parameters, particularly temperature control during the bonding phase, to favor the formation of the nuclei of new grains at a rapid rate to provide an excess of nuclei and thereby to favor a fine grain size after

TABLE I

| Metal, Alloy | Recrystallization Temp. | |
| --- | --- | --- |
| | °C | °F |
| Aluminum, pure | 150 | 302 |
| Aluminum alloy 5005 | | |
| 10% cold work | 454 | 850 |
| 25% cold work | 389 | 700 |

| | | |
|---|---|---|
| Copper, pure | 200 | 392 |
| Iron, pure | 450 | 842 |
| Magnesium, pure | 150 | 302 |
| Molybdenum, pure | 900 | 1652 |
| Monel alloy (Ni-30 Ca) | | |
| 10% cold work | 660 | 1220 |
| 50% cold work | 600 | 1112 |
| Steels | | |
| 7 1/2% cold work | ≈850 | ≈1560 |
| 20% cold work | ≈525 | ≈975 |
| Titanium alloys | | |
| Ti-5Al-2.5Sn | 704–760 | 1300–1400 |
| Ti-7Al- 4Mo | ≈650 | ≈1200 |
| Ti-4Al- 4Mn | 538–650 | 1000–1200 | recrystallization or transformation. In this way joinder of the materials at the faying surfaces is enhanced as a result of the large number of small grains which grow under annealing or other suitable heat treatment operations. Subsequent to the formation of the diffusion bond, the bonded assembly or joint area thereof may also be subjected to other heat treatment such as normalizing or homogenization to refine the alloy microstructure for maximization or optimization of the properties of the assembly.

The above-described results are achieved by alternatively and repetitively heating the alloys to a temperature slightly above the recrystallization temperature or transformation temperature as the case may be and cooling to a level slightly below that temperature. At temperatures slightly above the recrystallization or transformation, typically within 50° F. or less, the rate of nucleation is exceedingly high while grain growth rates are very low. At the higher temperatures, the nucleation rate rapidly decreases while the propensity for grain growth increases. By a rapid repetitive heating and cooling just above and just below the recrystallization or transformation temperature a sufficient number of nuclei are produced so that a subsequent normalizing or hardening heat treatment, properly conducted, will normally provide grain growth to the desired size. In alloys wherein the recrystallization temperature is not sharp or well-defined, or wherein conditions cannot be established providing a high rate of nucleation at a low grain growth rate, nucleation in the absence of grain growth cannot be achieved satisfactorily.

The temperature to which cooling is effected is not critical although in practice, reheating is commenced for practical reasons when the temperature falls slightly below the temperature at which the desired nucleation occurs. There is no need to cool the parts significantly below the recrystallization or transformation temperature until the bonding sequence is complete.

In all diffusion bonding processes, the strength of the bond is dependent upon the condition of the mating surfaces inasmuch as intimate contact is required, in most instances, for the necessary solid state reaction to occur. And this is particularly true in processes utilizing relatively low closure pressures.

Pressure forcing one surface to be bonded against the cooperating surface of the other part is a definite aid to the bonding process and some plastic deformation at the interface area is desirable to close down on the voids, however small, resultant from imperfections in the surfaces. In general, in the present process the pressures are limited to levels calculated to provide minimum macroscopic deformation or distortion at the joint. Furthermore, inasmuch as the usual temperature levels employed in the present process to provide the high energy context required for nucleation are high, the closure pressures employed are relatively low. As previously indicated, however, tolerable limits are dependent not only upon the particular alloys involved but also upon the joint geometry and the tolerable extent of metal upset. In terms of surface finish for the better joints a smoothness of 16 rms or better is preferred.

It may be desirable in some alloy systems, or perhaps even necessary, to utilize a bond-promoter between the surfaces to be joined to improve the quality of the joint. The use of such materials is described in the U.S. Pat. to Gemma No. 3,262,719 and La Pan et al. No. 3,349,465. The bond-promoter may function in any of several ways, viz., by providing better surface-to-surface contact; by reducing the presence of bond-inhibiting contamination; or by minimizing the formation or brittle or impervious alloy phases or zones at the interface. While the use of thin layers of such materials is contemplated, as necessary, in the present process, generally they must be such as to provide the minimum interference with the basic nucleation mechanism and the minimum heterogeneity at the interface. Accordingly, the very thin layers are usually much preferred.

In one circumstance, two thin metal cylinders formed of the AISI 52100 steel alloy, were joined end-to-end. The pressures utilized were 3350 p.s.i. cold and 4350 p.s.i. after heating of the parts and thermal expansion. Heating at the joint was accomplished utilizing an annular focused cold cathode as the heating source under an absolute pressure of 90–100 microns air, and cycling was effected according to the program illustrated in FIG. 1.

Photomicroscopy showed the initiation of new grains across the interface although the total heating period was only 88 seconds. The normal diffusion bonding cycle with conventional processes for this material at these pressures requires at least ten minutes and usually one hour is allotted. Pulse times for heating in the present process were just sufficient to produce a positive red coloration at the bond region, the high temperature corresponding to a range in this example of about 1560°–1740° F.

As may readily be seen from the foregoing description, the rate of diffusion bonding between components may be drastically increased by the rapid thermal cycling of the alloys between temperatures slightly above and below the recrystallization temperature or allotropic transformation temperature, as the case may be, providing a high rate of generation of new grain nuclei while controlling grain growth at the interface. While the invention has been described in detail in connection with certain preferred embodiments and examples these are intended to be illustrative only. The invention in its broader aspects is not limited to the exact details described, for obvious modifications will occur to those skilled in the art.

We claim:

1. The method of effecting a diffusion bond between metal components formed from those metals or metal alloys exhibiting either a well-defined recrystallization or allotropic transformation temperature which comprises the steps of:

positioning the components with the surfaces to be joined in intimate contact under a closure pressure at the interface;

and repetitively thermally cycling the alloy surfaces between temperature levels slightly above and below the recrystallization or allotropic transformation temperature to provide a high rate of generation of new grain nuclei while inhibiting grain growth, forming a diffusion bond between the surfaces.

2. The method according to claim 1 wherein;

the closure pressure does not exceed that providing a tolerable deformation at the bonding temperature.

3. The method according to claim 1 wherein;

subsequent to the bonding step, the bonded alloys at the interface are normalized or homogenized by heat treatment.

* * * * *